United States Patent [19]

Habermehl et al.

[11] Patent Number: 5,568,753

[45] Date of Patent: Oct. 29, 1996

[54] SCREW DRIVER WITH REPLACEABLE NOSE FOR COLLATED SCREWS

[75] Inventors: G. Lyle Habermehl, 436 Calvert Dr., Gallatin, Tenn. 37066; Paul T. Scherer, Lexington, Ky.

[73] Assignee: G. Lyle Habermehl, Gallatin, Tenn.

[21] Appl. No.: 511,945

[22] Filed: Aug. 7, 1995

Related U.S. Application Data

[63] Continuation-in-part of Ser. No. 233,909, Apr. 28, 1994, which is a continuation-in-part of Ser. No. 198,129, Feb. 17, 1994, Pat. No. 5,469,767, which is a continuation-in-part of Ser. No. 18,897, Feb. 17, 1993, Pat. No. 5,337,635.

[51] Int. Cl.⁶ .................................................. B25B 23/06
[52] U.S. Cl. ............................................. 81/434; 227/136
[58] Field of Search ............................ 81/57.37, 434; 227/136

[56] References Cited

U.S. PATENT DOCUMENTS

| | | | |
|---|---|---|---|
| 1,815,594 | 7/1931 | Shaw et al. | |
| 3,601,168 | 8/1971 | Farnstrom | 144/32 |
| 3,623,646 | 11/1971 | Cast | 227/136 |
| 3,826,419 | 7/1974 | Maestri | 227/136 |
| 3,920,324 | 10/1975 | Nasiatka | 144/32 |
| 3,930,297 | 1/1976 | Potucek | 29/431 |
| 4,018,254 | 4/1977 | DeCaro | 144/32 R |
| 4,146,071 | 3/1979 | Mueller et al. | 144/32 |
| 4,167,229 | 9/1979 | Keusch | 206/343 |
| 4,367,837 | 1/1983 | Manino | 227/136 |
| 4,404,877 | 9/1983 | Mizuno et al. | 81/57.37 |
| 4,428,261 | 1/1984 | Takatsu et al. | 81/434 |
| 4,625,597 | 12/1986 | Cast | 81/57.37 |
| 4,930,630 | 6/1990 | Habermehl | 206/347 |
| 4,998,452 | 3/1991 | Blum | 81/57.37 |
| 5,027,679 | 7/1991 | Kawashima | 81/434 |
| 5,083,483 | 1/1992 | Takagi | 81/434 |
| 5,186,085 | 2/1993 | Monacelli | 81/434 |
| 5,231,900 | 8/1993 | Deri | 81/57.37 |
| 5,284,074 | 2/1994 | Chen | 81/434 |
| 5,303,620 | 4/1994 | Payne et al. | 81/434 |
| 5,473,965 | 12/1995 | Chen . | |

FOREIGN PATENT DOCUMENTS

| | | |
|---|---|---|
| 2750562 | 5/1979 | Germany . |
| 2132531 | 7/1984 | United Kingdom ............ B25B 23/02 |
| 2147873 | 5/1985 | United Kingdom . |

*Primary Examiner*—James G. Smith
*Attorney, Agent, or Firm*—Dorsey & Whitney LLP

[57] ABSTRACT

This invention provides a driver attachment for a collated screwstrip in which a slide body is slidable in a housing parallel a longitudinal axis about which drive shaft is rotatable. The slide body has a rear portion and a removable nose portion. The housing and rear portion of the slide body form an integral part effectively permanently assembled and including a screw feed activation mechanism coupled between the housing and rear portion and which translates relative sliding movement and positioning of the rear portion of the slide body relative the housing. The nose portion is removable from the rear portion for ease of replacement with other nose portions adapted for use with the same or different sized screwstrips and/or screws. The nose portion includes a channel to guide a collated screwstrip generally transversely to the longitudinal axis of the drive shaft. The nose portion includes a guide mechanism to locate each successive screw advanced through the channel into axial alignment with the drive shaft for engagement therewith. The nose portion also includes a screw feed advance mechanism to advance the screwstrip through the channel when activated by the screw feed activation mechanism. The screw feed advance mechanism readily uncouples from and couples with the screw feed activation mechanism on uncoupling and coupling of the nose portion with the rear portion.

24 Claims, 7 Drawing Sheets

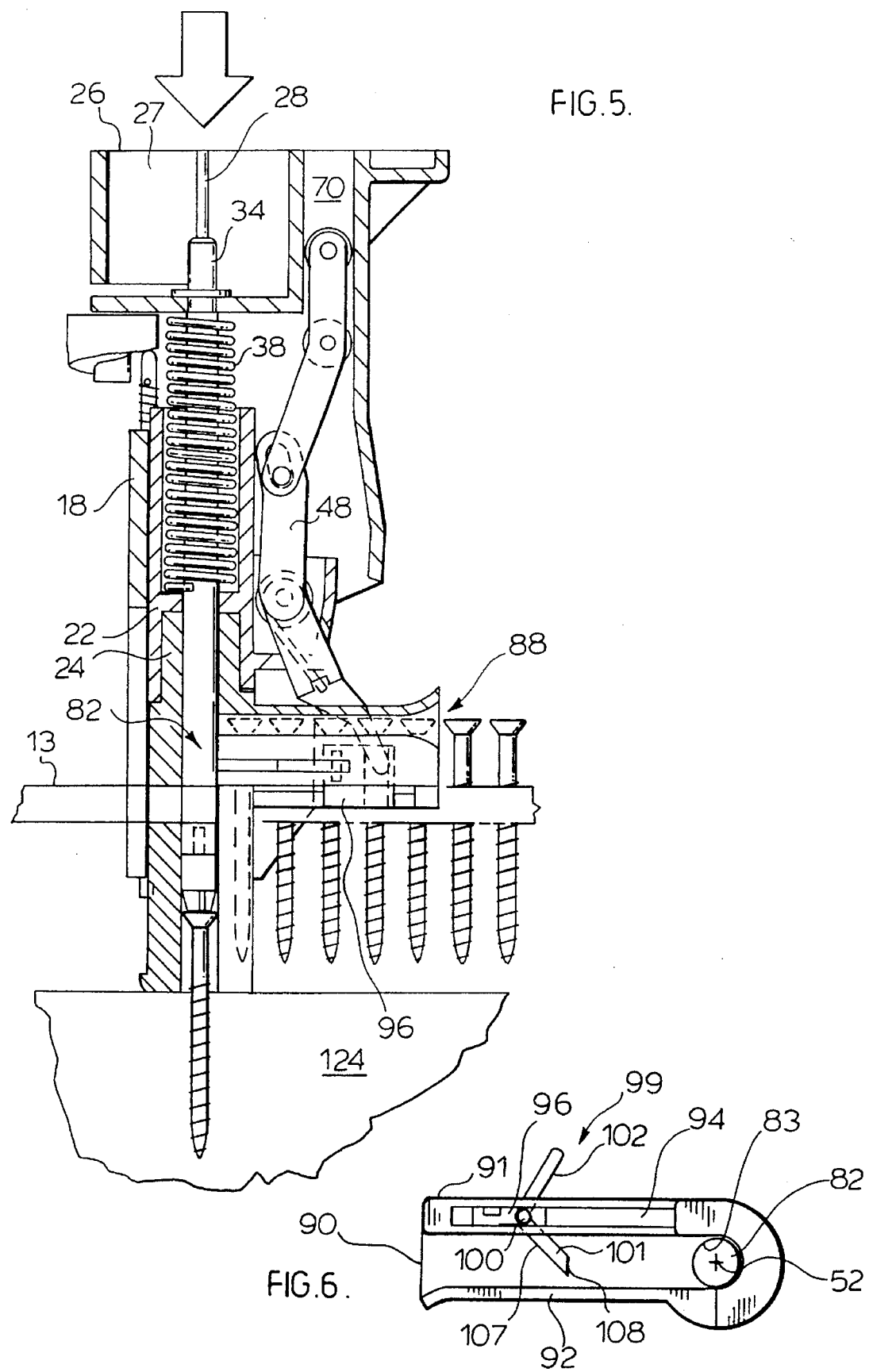

SCREW DRIVER WITH REPLACEABLE NOSE FOR COLLATED SCREWS

RELATED APPLICATION

This application is a continuation-in-part of U.S. patent application Ser. No. 08/233,909 filed Apr. 28, 1994 which is a continuation-in-part of U.S. patent application Ser. No. 08/198,129 filed Feb. 17, 1994 U.S. Pat. No. 5,469,767, which is a continuation-in-part of U.S. patent application Ser. No. 08/018,897, filed Feb. 17, 1993, U.S. Pat. No. 5,337,635.

SCOPE OF THE INVENTION

This invention relates generally to a screwdriver for driving collated screws which are joined together in a strip, and, more particularly, to a power screwdriver with a replaceable nose portion which renders the screwdriver adaptable for use in driving screws having different lengths and diameter screw heads.

BACKGROUND OF THE INVENTION

Collated screwstrips are known in which the screws are connected to each other by a retaining strip of plastic material. Such strips are taught, for example, by U.S. Pat. No. 4,167,229 issued Sep. 11, 1979 and its related Canadian Patents 1,040,600 and 1,054,982 as well as U.S. Pat. No. 4,930,630, the disclosures of which are incorporated herein by reference. Screws carried in such screwstrips are adapted to be successively incrementally advanced to a position in alignment with and to be engaged by a bit of a reciprocating, rotating power screwdriver and screwed into a workpiece. In the course of the bit engaging the screws and driving it into a workpiece, the screw becomes detached from the plastic strip leaving the strip as a continuous length.

In the use of such collated screwstrips in screwdrivers, the strip serves a function of assisting in guiding the screw into a workpiece and, to accomplish this, the strip is retained against movement towards the workpiece. In the screwstrip, each screw to be driven has its threaded shaft threadably engaged in a threaded sleeve of the strip such that on the screwdriver engaging and rotating each successive screw, the screw turns within the sleeve which acts to guide the screw as it moves forwardly into threaded engagement into the workpiece. Preferably, only after the tip of the screw becomes engaged in the workpiece, does the head of the screw come into contact with the sleeves. Further, forward movement of the screw into the workpiece then draws the head downwardly to engage the sleeve and to rupture the sleeve by reason of the forward movement of the head with the strip retained against movement towards the workpiece. The sleeve preferably is configured to have fragile straps which break on the head passing through the sleeve such that the strip remains intact as a continuous length. Since the strip is a continuous length, on advancing the screwstrip with each successive screw to be driven, it necessarily results that portions of the strip from which each screw has been driven are also advanced to exit from the power screwdriver.

Known power screwdrivers for driving such collated screwstrips include U.S. Pat. No. 4,146,871 to Mueller et al, issued Mar. 27, 1976, and U.S. Pat. No. 5,186,085 to Monaceli, issued Feb. 16, 1993, the disclosures of which are incorporated herein by reference. Such known power screwdrivers include a rotatable and reciprocally moving screwdriver shaft which is turned in rotation by an electric motor. A screwdriving bit forms a forwardmost portion of the shaft for engaging the head of each successive screw as each screw is moved into a driving position, axially aligned under the screwdriver shaft.

An important aspect of such power screwdriver is the manner and accuracy with which the screws are advanced and positioned so as to be properly aligned axially under the screwdriver shaft for successful initial and continued engagement between the bit and the screwdriver head in driving a screw fully down into a workpiece. In the device of Mueller et al, a guide channel is provided through which the screwstrip is advanced. The guide channel is sized to receive screws of specific head size and minimum length. The guide channel is formed as an integral part of a sliding body which also carries other components of a screw advance mechanism including a feed pawl to engage the screwstrip and thereby advance successive screws in the screwstrip. The screws are successively advanced into position in alignment with the screwdriver shaft with the heads of the screws being urged into abutment with a stop which is to locate the screw head. The stop typically defines a radial extent of a boreway through which the shaft and screw head axially move as the screw is driven.

The shaft is axially movable in the boreway in a reciprocal manner to engage the screw and drive it into a work-piece. After each screw is driven the shaft retracts and a subsequent screw carried on the screwstrip is advanced sideways into the boreway, engaging the stop so as to be aligned under the shaft.

A disadvantage with screwdrivers such as taught by Mueller et al and others is that the screwdrivers are not adapted to drive different sized screwstrips or screws. Known screw drivers have a guide channel which is sized to receive only screws of certain dimensions. Similarly, the screw advance mechanism is adapted only to advance screws by contacting screws and/or the strips at certain places determined by the size of the screws and configuration of the screwstrips. As well, the screw advance mechanism is adapted only to advance the screwstrip a certain maximum stroke determined by one pre-selected spacing of the screws on the strip. Any stop provided to locate screw heads if adjustable, is typically only adjustable to accommodate screws of slightly varying head sizes. The construction of most known screwdrivers and particularly of their screw guide channels, screw advance mechanisms and screw locating stops has the disadvantage of not permitting one screwdriver to practically be adjusted to drive screwstrips and/or screws of different sizes.

SUMMARY OF THE INVENTION

To at least partially overcome these disadvantages of the prior art, the present invention provides a screwdriver for driving screws, in which a removable nose portion is provided to be removable from the screwdriver for replacement by other nose portions. The nose portion carries a guide channel through which screws are advanced, a locating guide which holds each successive screw in axial alignment with the drive shaft to drive the screw and/or a screw advance mechanism to incrementally advance the screws in the guide channel into the locating guide.

An object of the present invention is to provide a screwdriver for driving screws having different lengths and/or screw head diameters, wherein the screwdriver may be quickly and inexpensively customized for optimal placement and driving of various screws having other lengths and/or screw head diameters.

A further object, is to provide a power screwdriver adapted for driving different screwstrips having different sizes of threaded fasteners collated together in a parallel spaced orientation on a retaining strip.

This invention provides a driver attachment for a collated screwstrip in which a slide body is slidable in a housing parallel a longitudinal axis about which drive shaft is rotatable. The slide body has a rear portion and a removable nose portion. The housing and rear portion of the slide body form an integral part effectively permanently assembled and including a screw feed activation mechanism coupled between the housing and rear portion and which translates relative sliding movement and positioning of the rear portion of the slide body relative the housing. The nose portion is removable from the rear portion for ease of replacement with other nose portions adapted for use with the same or different sized screwstrips and/or screws. The nose portion includes a channel to guide a collated screwstrip generally transversely to the longitudinal axis of the drive shaft. The nose portion includes a guide mechanism to locate each successive screw advanced through the channel into axial alignment with the drive shaft for engagement therewith. The nose portion also includes a screw feed advance mechanism to advance the screwstrip through the channel when activated by the screw feed activation mechanism. The screw feed advance mechanism readily uncouples from and couples with the screw feed activation mechanism on uncoupling and coupling of the nose portion with the rear portion.

Accordingly, in one aspect, the present invention provides an apparatus for driving with a power driver a screwstrip comprising threaded fasteners such as screws or the like, which are joined together in a strip comprising:

housing means;

elongate drive shaft means for operative connection to a power driver for rotation thereby about a longitudinal axis;

slide body means coupled to the housing means for displacement parallel to the axis of the drive shaft means between an extended position and a retracted position;

spring means biasing said body means forwardly relative to the housing means parallel the longitudinal axis to the extended position;

the slide body means having a rear portion and a forward nose portion, the nose portion removably coupled to the rear portion;

the nose portion having:
(a) guide channel means for said screwstrip extending through said nose portion,
(b) guide means to locate successive of the screws advanced via the guide channel means to be axially in alignment with said drive shaft means for engagement in driving of the screws from the guide means by the drive shaft means, and
(c) screw feed advance means carried by the nose portion to engage the screwstrip and successively, incrementally advance screws on the screwstrip through the guide channel means, screw feed activation means coupled between the rear portion of the slide body means and the housing means and, when the nose portion is coupled to the rear portion, removably coupling with the screw feed advance means whereby displacement of the slide body means relative the housing means between the extended position and the retracted position activates the screw feed activation means to move the screw feed advance means and thereby advance successive screws;

wherein the nose portion removably couples to and is removable from the rear portion for replacement with other nose portions adapted to receive the same or different sized screwstrips and/or screws; and wherein on the nose portion coupling to or being removed from coupling with the rear portion, the screw feed advance means correspondingly removably coupling to or being removed from coupling with the screw feed activation means.

BRIEF DESCRIPTION OF THE DRAWINGS

Further aspects and advantages of the present invention will appear from the following description taken together with the accompanying drawings, in which:

FIG. 5 is a view identical to FIG. 4 but with the drive attachment in a partially retracted position in driving a screw into a workpiece;

FIG. 6 is an end view of the nose portion of FIG. 2;

DETAILED DESCRIPTION OF THE DRAWINGS

Figure 1:
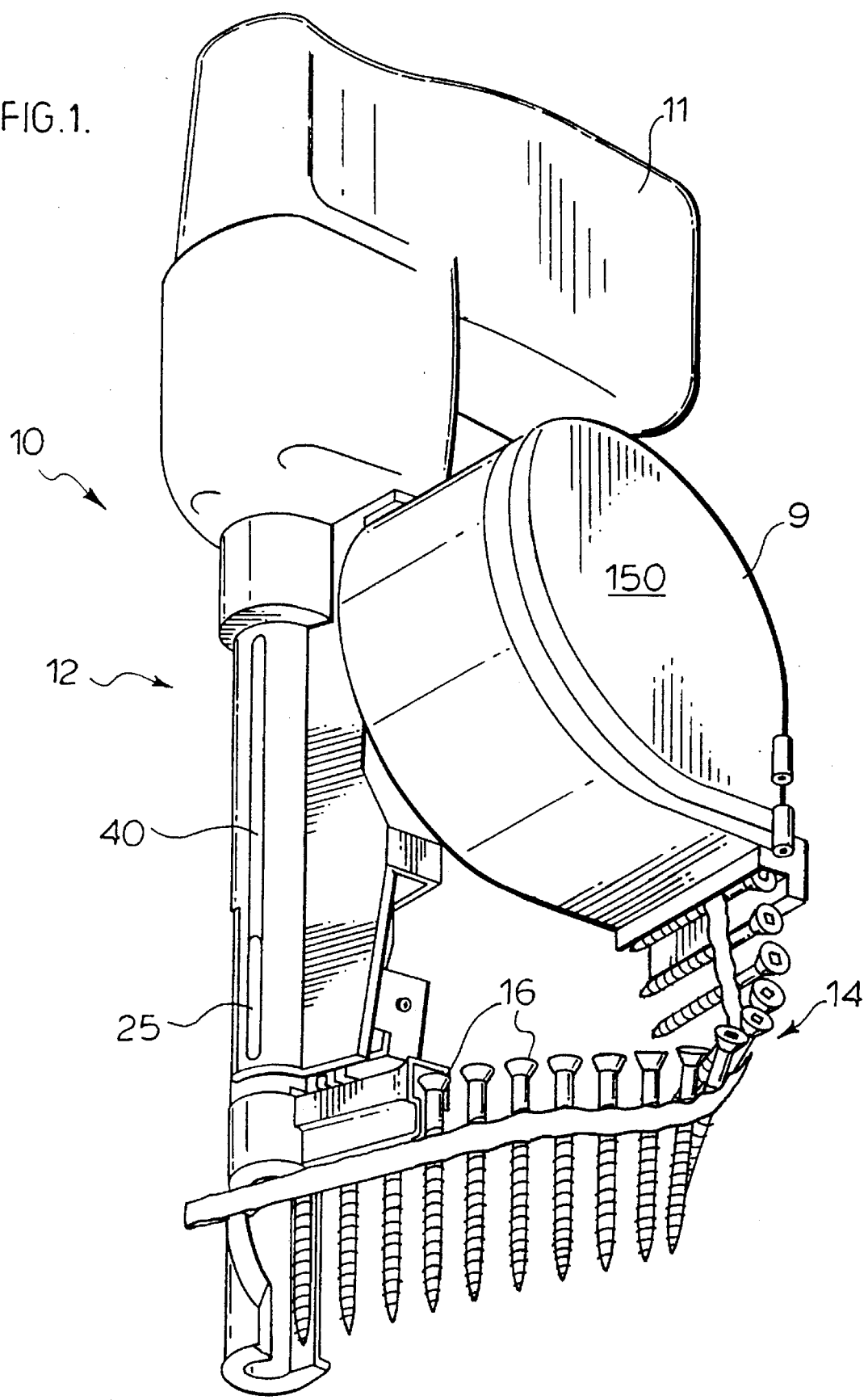
FIG. 1 is a pictorial view of a power screwdriver in accordance with a first preferred embodiment of the present invention.

Reference is made to FIG. 1 which shows a complete power screwdriver assembly 10 in accordance with the present invention. The assembly 10 comprises a power driver 11 to which a driver attachment 12 is secured. The driver attachment 12 carries a cartridge 9 containing a coil of a collated screwstrip 14 with spaced screws 16 to be successively driven.

Figure 2:
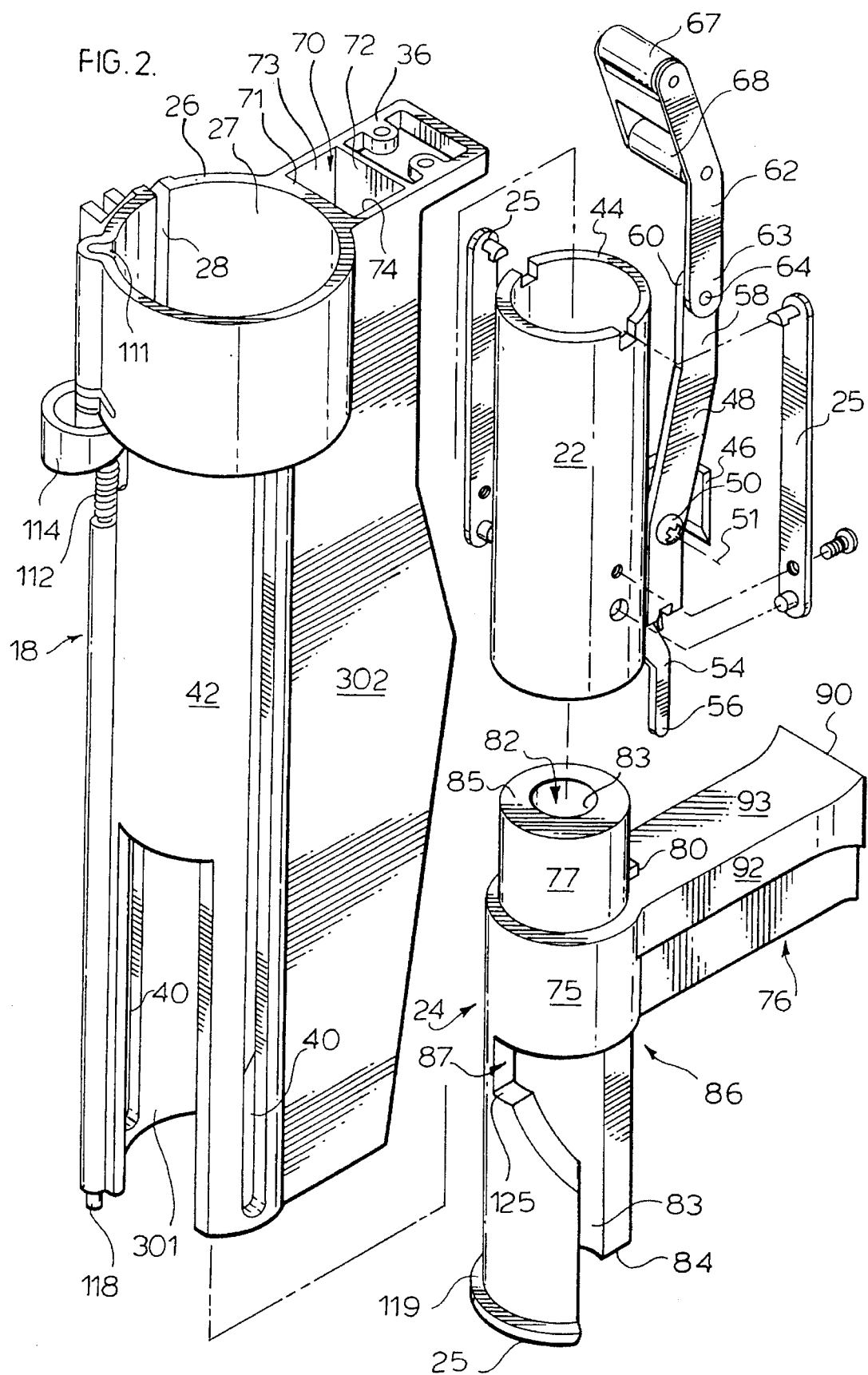
FIG. 2 is an exploded pictorial view of the housing and slide body shown in FIG. 1.
Figure 4:
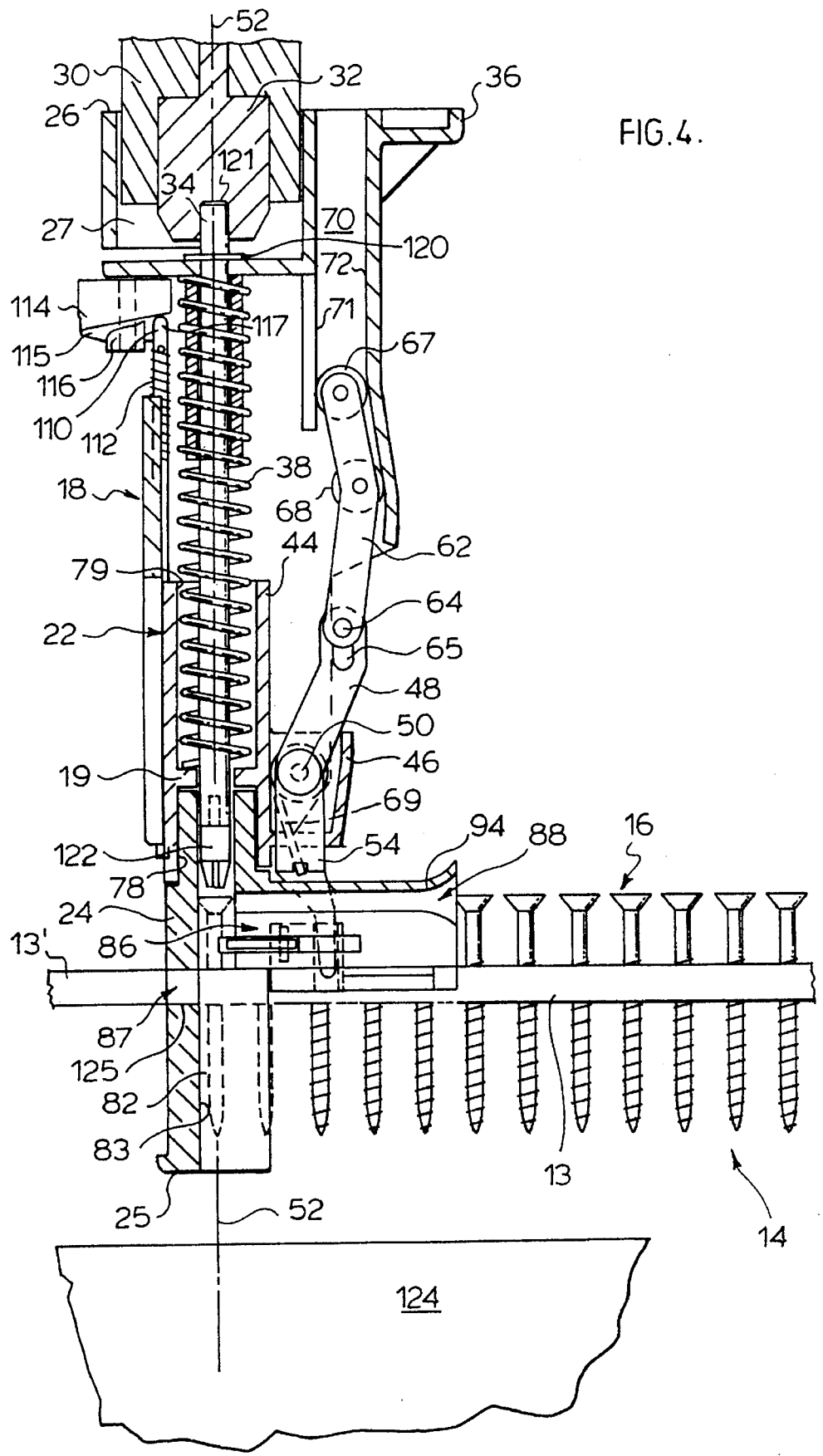
FIG. 4 is a schematic partially cross-sectional view of the driver attachment of FIG. 1 in a fully extended position as seen in FIG. 1 through a plane passing through the longitudinal axis of the drive shaft and centrally of the screws in the screwstrip.

Reference is made to FIG. 2 showing an exploded view of major components of the driver attachment 12 as housing 18 and a slide body comprising a rear portion 22 and a removable nose portion 24. FIGS. 4 and 5 show in cross-section the interaction of these components.

As seen in FIG. 4, the rearmost end 26 of the housing 18 has a rearwardly directed socket 27 with a longitudinal slot 28 in its sidewall to receive and securely clamp the housing 18 onto the housing 30 of the power driver 11 so as to secure the housing 18 of the driver attachment to the housing 30 of the power driver against relative movement. The power driver 11 has a chuck 32 rotatable in the driver housing 30 by an electric motor (not shown). The chuck 32 releasably engages the driver shaft 34 in known manner. The housing 18 is provided with a lateral flange 36 at its rear end to which a known screwstrip containing cartridge 9 is secured in a conventional manner.

As seen in FIG. 4, the slide body 20 is slidably received in the housing 18 with the driver shaft 34 received in a bore passing through the rear portion 22 and nose portion 24 of the slide body 20. A compression spring 38 disposed between the housing 18 and the rear portion 22 coaxially about the driver shaft 34 biases the slide body away from the housing 18 from a retracted position towards an extended position. As shown, the spring 38 is disposed between the housing 18 and the rear portion 22. Slide stops 25, best shown in FIG. 2, are secured to the rear portion 22 of the slide body. Two slide stops 25 slide in two longitudinal slots 40 on each side of the part cylindrical sidewall 42 of the housing 18 to key the rear portion 22 of the slide body to the housing 18 against relative rotation and to prevent the slide body being moved out of the housing 18 past a fully extended position.

The rear portion 22 comprises a generally cylindrical element 44 with a radially extending flange element 46 on one side. A lever 48 is pivotally mounted to the flange element 46 by bolt 50 for pivoting about an axis 51 of bolt 50 normal to a longitudinal axis 52 which passes centrally through the drive shaft 34 and about which the drive shaft is rotatable. Lever 48 has a forward arm 54 extending forwardly to its front end 56 and a rear arm 58 extending rearwardly to its rear end 60. A cam follower 62 has its forward end 63 mounted to the rear end 60 of the rear arm 58 by a bolt 64 being received in a slot 65 extending longitudinally in the rear end of the rear arm 58. The cam follower 62 has at its rear end 66 two cam rollers 67 and 68 rotatable on pins parallel to the axis of bolts 50 and 64.

As seen in FIGS. 2 and 4, the housing 18 carries a camming channel 70 in which the cam rollers 67 and 68 are received. The camming channel 70 is disposed to one side of the driver shaft 34 and extends generally parallel thereto. The camming channel 70 has opposed camming surfaces 71 and 72 at least partially closed by sidewalls 73 and 74.

The camming channel 70 extends rearwardly beside the socket 27 of housing 18 and thus rearwardly past the chuck 32 of the power driver 11 to one side thereof. This configuration permits the use of a housing 18 which is of a lesser length parallel longitudinal axis 52 for a given length of the cam follower 62 and of the lever 48, rearward of bolt 50.

A spring 69 wound about bolt 50 is disposed between the flange element 46 and the forward arm 54 of the lever 48 to bias the lever in a clockwise direction as seen in FIG. 4. The effect of spring 69 is to urge the cam roller 67 into engagement with cam surface 71 and to urge cam roller 68 into engagement with cam surface 72.

With relative sliding of the slide body 20 and the housing 18 between the extended and the retracted positions, the cam follower 62 translates the relative movement and positioning of the slide body 20 and housing 18 into relative pivoting and positioning of the lever 48 about the axis 51. The ability of bolt 64 to slide longitudinally in the longitudinal slot 65 provides a lost motion linkage as is known and is advantages such that the relative timing of pivoting of the lever 48 varies as compared to the relative location of the slide body 20 and housing 18 in moving towards an extended position as contrasted with moving towards a retracted position.

The nose portion 24 has a generally cylindrical screw guide element or guide tube 75 arranged generally coaxially about longitudinal axis 52 and a flange-like screw feed channel element 76 extending radially from the guide tube 75.

Figure 7:
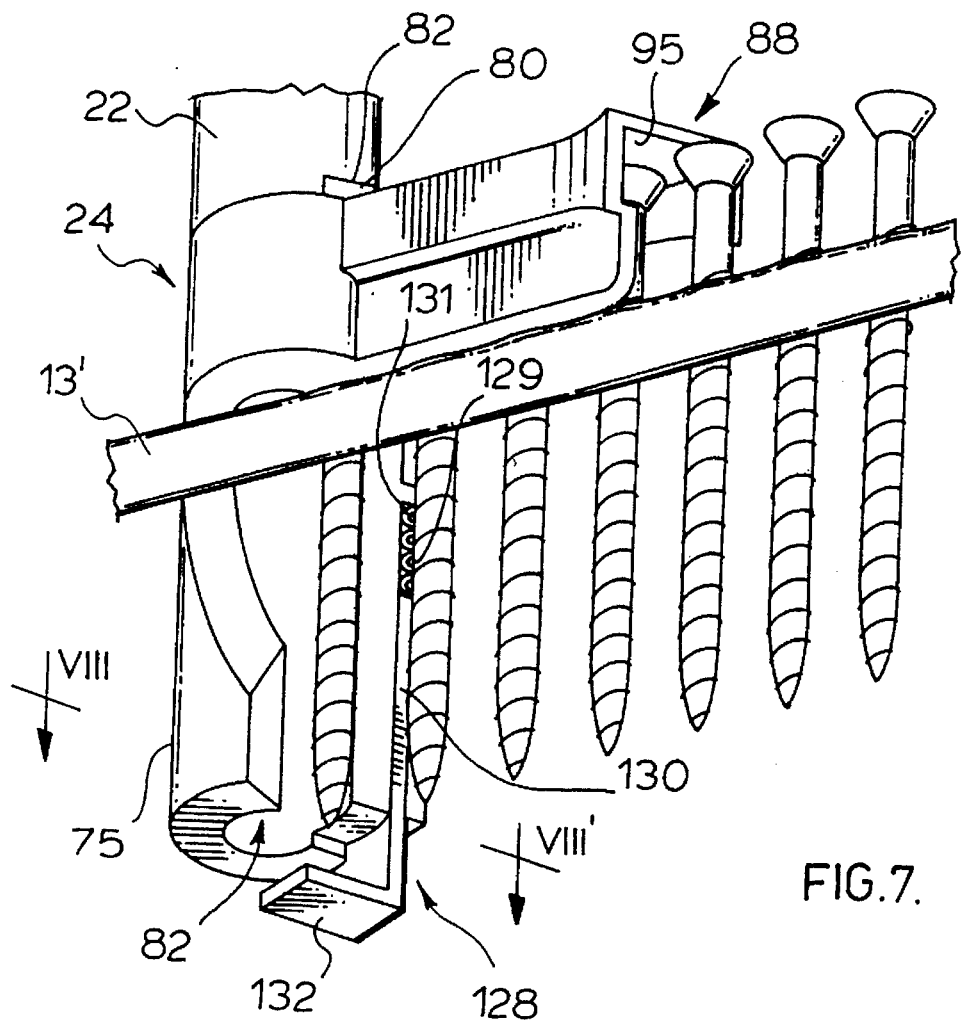
FIG. 7 is a pictorial view of the nose portion shown in FIG. 2 but modified in accordance with a second embodiment of the invention to provide a retractable screw locating plate.

The guide tube 75 has a cylindrical portion 77 at its rear end with a cylindrical exterior surface sized to be closely received, preferably in a friction fit, within a forwardly opening cylindrical bore 78 in the forward end of the rear portion 22. A radially extending key 80 is provided to extend from the cylindrical portion 77 of the nose portion 24 to be received in a correspondingly sized keyway slot 82 in the rear portion 22 as best seen in FIGS. 4 and 7 to secure the nose portion 24 to the rear portion 22 against relative pivoting about the longitudinal axis 52.

The guide tube 75 has a cylindrical bore or guideway 82 extending axially through the guide tube with the guideway 82 delineated and bordered by a radially extending cylindrical sidewall 83 and open at its forward axial end 84 and at its rearward axial end 85.

The guide tube 75 has a rearward section adjacent its rear end 85 in which the sidewall 83 extends 360° about the guideway 82. Forward of the rearward section, the guide tube has a forward section best seen in FIG. 4 and which has an access opening 86, shown in the drawings as being on the right hand side of the guide tube 75. Screw access opening 86 is provided to permit the screwstrip 14 including retaining strip 13 and screws 16 to move radially inwardly into the guideway 82 from the right as seen in FIGS. 4 and 5. Each screw preferably has a head 17 with a diameter marginally smaller than the diameter of the sidewall 83. It follows that where the head of the screw is to enter the guideway 82, the screw access opening must have a circumferential extent of at least 180°. Where the shank 208 of the screw is to enter the guideway, the screw access opening may have a lesser circumferential extent.

In the forward section, the sidewall 83 of the guide tube 75 engages the radially outermost periphery of the head 17 of the screw 16, to axially locate the screw head 17 coaxially within the guideway 82 in axial alignment with the drive shaft 34. In this regard, the sidewall 83 preferably extends about the screw sufficiently to coaxially locate the screw head and thus preferably extend about the screw head at least 120°, more preferably, at least 150° and most preferably about 180°.

An exit opening 87, shown towards the left hand side of the guide tube 75 in FIGS. 4 and 5, is provided of a size to permit the spend plastic strip 13 from which the screws 16 have been driven to exit from the guideway 82. Forwardly of the exit opening 87, the sidewall 83 of the guide tube 75 is shown as extending greater than about 180° about the longitudinal axis 52 so as to continue to provide a sidewall 83 which can assist and positively coaxially guiding the head 17 of a screw 16 being driven.

Figure 3:
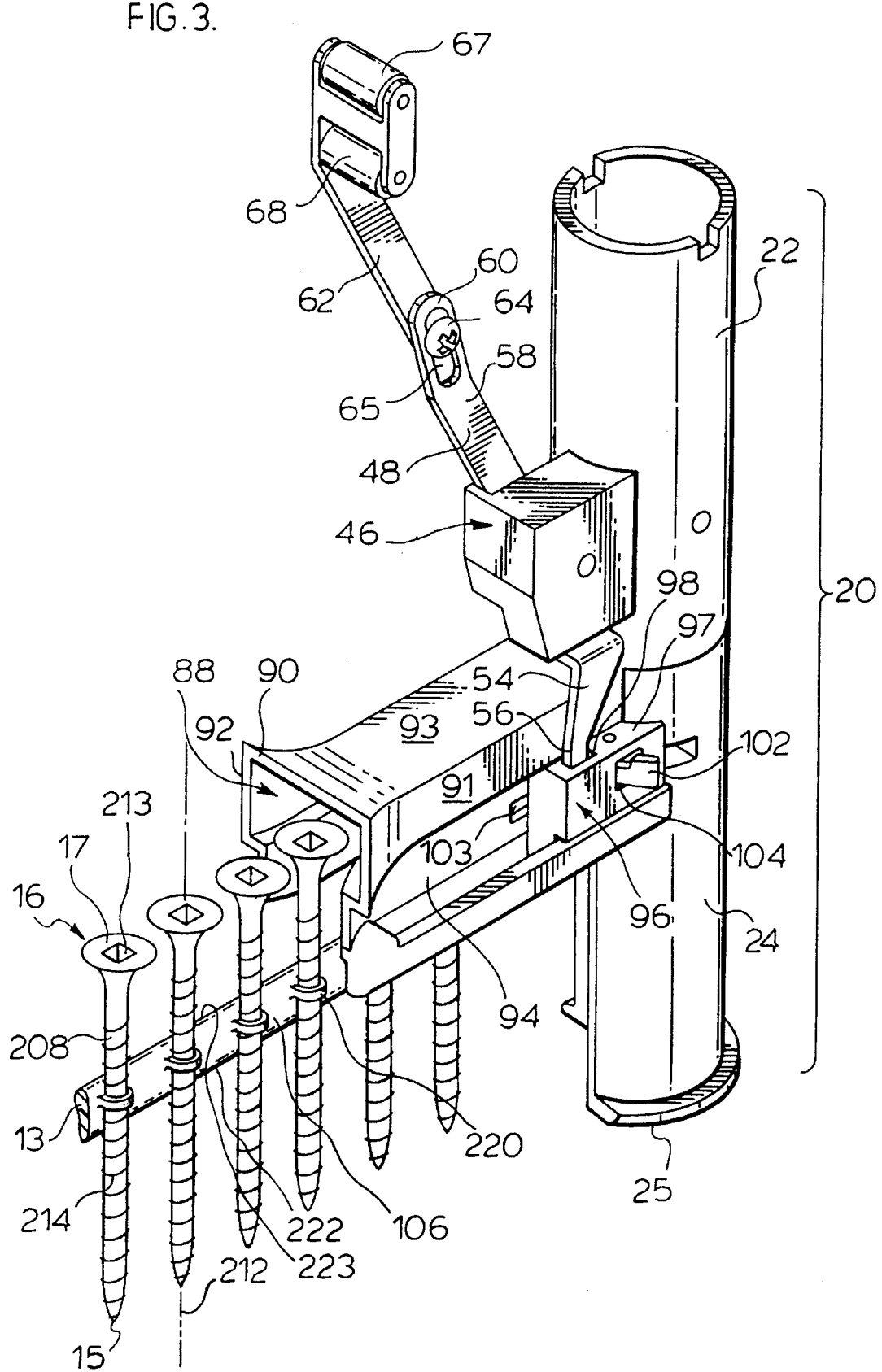
FIG. 3 is a pictorial view of the opposite side of the slide body to that shown in FIG. 2 but with a screwstrip positioned therein.

The screw feed channel element 76 is best seen in FIGS. 3 and 4 as providing a channelway 88 which extends radially relative the longitudinal axis 52 to intersect with the guideway 82 in the guide tube 75. In this regard, the channelway 88 opens to the guideway 82 as the screw access opening 86. The channelway 88 provides a channel of a cross-section similar to that of the screw access opening 86 from the screw access opening 86 to a remote entranceway opening 90. The channelway 88 is defined between two sidewalls 91 and 92 joined by a top wall 93. The major sidewall 91 is shown as extending from the heads 17 of the screws 16 forwardly to at least partially behind the plastic retaining strip 13. The lesser sidewall 92 is shown as extending from the heads 17 of the screws 16 forwardly to above the plastic strip 13. The sidewalls 91 and 92 define the channelway 88 with a cross-section conforming closely to that of the screwstrip 14 and its strip 13 and screws 16 with an enlarged width where the heads of the screws are located and an enlarged width where the retaining strip 13 is provided about the screws. The sidewalls 91 and 92 also have an enlarged funneling section at the entranceway opening 90 which tapers inwardly to assist in guiding the screwstrip to enter the channelway.

As best seen in FIG. 3, the major sidewall 91 is provided on its exterior back surface with a raceway 94 extending parallel the channelway 88 and in which a shuttle 96 is captured to be slidable towards and away from the guide tube 75 between an advanced position near the guide tube and a withdrawn position remote from the guide tube. The shuttle 96 has a rear surface 97 in which there is provided a rearwardly directed opening 98 adapted to receive the front end 56 of the forward arm 54 of lever 48 so as to couple the shuttle 96 to the lever 48 for movement therewith.

Shuttle 96 carries a pawl 99 to engage the screwstrip 14 and with movement of the shuttle 96 to successively advance the strip one screw at a time. As seen in FIG. 6, the shuttle 96 has a fixed post 100 on which the pawl 99 is journalled about an axis parallel the longitudinal axis 52 about which the driver shaft 34 rotates. The pawl 99 has a strip pusher arm 101 which extends through a slot 103 in the major sidewall 91 to engage and advance the screwstrip. The pawl 99 has a manual release arm 102 away from pusher arm 101 and which extends out through a slot 104 in the shuttle 99. A torsional spring is disposed about post 100 between pawl 99 and shuttle 96 and urges the pusher arm 101 clockwise as seen in FIG. 6. The spring biases the pusher arm 101 into the screwstrip 14. The engagement of release arm 102 on the right hand end of slot 104 limits the pivoting of the pawl 99 clockwise to the position shown in FIG. 6.

The pusher arm 101 of the pawl 99 has a cam face 107. On the shuttle moving away from the guide tube 75 towards the withdrawn position, i.e., to the left in FIG. 6, the cam face 107 will engage the screws 16 and/or the strip 13 and permit the pusher arm 101 to pivot about post 100 against the bias of spring so that the pusher arm 101 may move with the shuttle to the left.

The pusher arm 101 has an engagement face 108 to engage the screws 16 and/or strip 13. On the shuttle moving towards the guide tube 75 towards the advanced position, i.e., to the right in FIG. 6, the engagement face 108 will engage the screws 16 and/or strip 13 and advance the screwstrip to the right as seen in FIG. 6 so as to position a screw 16 into the guideway 82 in a position to be driven and to hold the screwstrip 14 against movement towards the left.

The release arm 102 permits manual withdrawal of the screwstrip 14. A user may with his finger or thumb manually pivot the release arm 102 against the bias of spring so that the pusher arm 101 and its engagement face 108 is moved away from and clear of the screwstrip 14 whereby the screwstrip may manually be withdrawn as may be useful to clear jams or change screwstrips.

With the nose portion 24 coupled to the rear portion 22, the lever 48 couples to the shuttle 96 with the forward arm 54 of lever 48 received in the opening 98 of the shuttle 96. Sliding of the slide body 20 and the housing 18 in a cycle from an extended position to a retracted position and then back to an extended position results in reciprocal pivoting of the lever 48 about axis 51 which slides the shuttle 96 between the advanced and withdrawn position in its raceway 94 and hence results in the pawl 99 first retracting from engagement with a first screw to be driven to behind the next screw 16 and then advancing this next screw into a position to be driven.

The nose portion 24 is removable from the rear portion 22. The nose portion 24 and rear portion 22 may be coupled together by axially inserting the cylindrical portion 77 of the guide tube 75 into the bore 78 in the rear portion 22 with the key 80 aligned with the keyway slot 82 and with the front end 56 of the forward arm 54 of the lever 48 aligned with the opening 98 in the shuttle 96. Thus, the removable nose portion 24 may be coupled to the rear portion 22 merely by axially aligning the nose portion and the rear portion and moving the two elements together in a direction parallel the longitudinal axis 52.

With the nose portion 24 held on the rear portion 22 by a friction fit, the nose portion 24 can manually be removed by a user merely by the manual application of force. The nose portion 24 is removable from the rear portion 22 without disassembly or uncoupling of any of the remainder of the screwdriver assembly 10. Thus, the nose portion 24 is removable without uncoupling of the rear portion 22 relative any of the housing 18, spring 38, power driver 11, driver shaft 34 or the screw feed activation mechanism comprising amongst other things the lever 48 and cam follower 62 and without uncoupling of the cam follower 62 in camming channel 70 of the housing 18.

The nose portion 24 carries the guide tube 75 with its screw locating guideway 82, the screw feed channel element 76 with its channelway 88, and screw feed advance mechanism with the reciprocating shuttle 96 and pawl 99 to advance the screwstrip 14 via the channelway 88 into the guideway 82. Each of the guideway 82, channelway 88 and shuttle 96 are preferably customized for screwstrips and screws or other fasteners of a corresponding size. In this context, size includes shape, head diameter, shaft diameter, retaining strip configuration, length, spacing of screws along the retaining strip and the presence or absence of washers amongst other things. Different nose portions 24 are to be configured for different screwstrips and screws. The different nose portions 24 are each compatible with the same rear portion 22 and are readily exchangeable so as to permit the driver attachment to be readily adapted to drive different screwstrips and screws.

Many changes can be made to the physical arrangement of the nose portion 24 to accommodate different screws and fasteners. For example, the cross-sectional shape of the channelway 88 can be changed as can the diameter of the guideway 82. The length of the sidewalls 91 and 92 about the channelway 88 can be varied to accommodate different size screws which may require greater or lesser engagement.

To adjust for different spacing between screws in different screwstrips, the stroke of the shuttle 96 in reciprocating back and forth can be shortened or lengthened by varying the distance from the axis 51 of the lever 48 to where the shuttle 96 engages the forward arm 54 of the lever 48. For example, placing the same shuttle 96 in a raceway 94 spaced further from the axis 51 will increase the length of the stroke of the shuttle 96 for the same arc of pivoting of lever 48. Similarly, using the same shuttle 96 in the same raceway 94 but having the opening 98 in the shuttle 96 to engage the lever 48 farther from the axis 51 will also increase the length of the stroke of the shuttle 96 for the same arc of pivoting of lever 48.

In contrast with the removable nose portion 24 which is intended to be provided in many different replaceable configurations, the remainder of the driver attachment is preferably of a constant unchanged configuration. In this regard, the remainder of the driver attachment may be characterized by the housing 18, rear portion 22 of the slide body 20, drive shaft 34 and spring 38 together with a screw feed activation mechanism comprising the lever 48 and cam follower 62 interacting between the rear portion 22 and the housing 18. This screw feed activation mechanism is activated by relative movement of the housing 18 and rear portion 22 and serves to engage and move the screw feed advance mechanism comprising the shuttle 96 and pawl 99 carried on the nose portion 24.

The construction of the housing 18 and slide body 20 provide for a compact driver attachment.

The housing 18 has a part cylindrical portion formed by sidewall 301.

The slide body 20 as best seen in FIG. 3 comprising the rear portion 22 and nose portion 24, has a part cylindrical portion of a uniform radius sized to be marginally smaller than the sidewall 301 of the housing 18. The sidewall 301 extends circumferentially about the part cylindrical portion of the slide body 20 to retain the slide body 20 therein.

The housing has a flange portion 302 which extends radially from one side of the part cylindrical portion and is adapted to house the radially extending flange 46 of the rear portion 22 and the screw feed activation mechanism comprising the camming channel 70 interacting with the lever 48 and cam follower 62. The flange portion 302 is open at its front end and side to permit the screw feed channel element 76 to slide into and out of the housing 18. Concentrically located about the drive shaft 34 is the spring 38, the part cylindrical portions of the slide body 20, and the part cylindrical portions of the housing 18.

The driver attachment is provided with an adjustable depth stop mechanism which can be used to adjust the fully retracted position, that is, the extent to which the slide body 20 may slide into the housing 18. The adjustable depth stop mechanism is best seen in FIGS. 2 and 3 as comprising an elongate rod 110 slidably received in an elongate open ended bore 111 provided in the sidewall 42 of the housing 18 and extending parallel to longitudinal axis 52.

A depth setting cam member 114 is secured to the housing 18 for rotation about a pin 116 parallel the longitudinal axis 52. The cam member 114 has a cam surface 115 which varies in depth, parallel the longitudinal axis 52, circumferentially about the cam member 114. A portion of the cam surface 115 is always axially in line with the rod 110. A spring 112 biases the rod 110 rearwardly such that the rear end 117 of the rod engages the cam surface 115. The spring 112 is disposed between the housing and a pin 113 on the rod. By rotation of the cam member 114, the extent to which the rod 110 may slide rearwardly is adjusted.

The rod 110 has a front end 118 which extends forwardly from bore 111 for engagement with a rearwardly directed annular stop surface 119 provided on the nose portion 24 of the slide body. The slide body 20 is prevented from further sliding into the housing 18 when the front end 118 of the rod 110 engages the stop surface 119. The extent the slide body 20 may slide into the housing 18 is determined by the length of the rod 110 and the depth of the cam member 114 axially in line with the rod. The cam member 114 is preferably provided with a ratchet-like arrangement to have the cam member 114 remain at any selected position biased against movement from the selected position and with circular indents or depressions in the cam surface 115 to assist in positive engagement by the rear end 117 of the rod. The cam member 114 is accessible by a user yet is provided to be out the way and not interfere with use of the driver attachment. The nose portion 24 may be customized for use in respect of different size screws by having the location of the stop surface 119 suitably provided axially on the nose portion 24 as may be advantageous for use of different size screws.

The driver shaft 34 is shown in FIGS. 4 and 5 as carrying a split washer 120 engaged in an annular groove near its rear end 121 to assist in retaining the rear end of the driver shaft in the socket 27 of the housing 18. The driver shaft 34 is provided with a removable bit 122 at its forward end which bit can readily be removed for replacement by another bit as for different size screws. Such bits include sockets and the like and any replacement bits will preferably be of an outside diameter complementary to the inside diameter of the guideway 82 in a corresponding replacement nose portion adapted for use with the corresponding sized screws. To accommodate bits of increased diameter over the bit shown in FIGS. 4 and 5, the guideway 82 of the guide tube 75 may be provided with an increased radius, at least commencing at the location where the bit may have an enlarged diameter and extending forwardly therefrom. The guideway 82 in the guide tubes 75 may thus have a step configuration with the sidewall 83 being of a reduced diameter where the driver shaft 34 enters the rear of the guide tube 75 and the sidewall 83 may then increase to an enlarged diameter forwardly to accommodate an enlarged bit such as a socket.

The rear portion 22 is shown in FIGS. 4 and 5 as having a radially inwardly extending annular flange 19 which provides the end of the forwardly opening bore 78 as well as the end of a rearwardly opening bore 79 within which the spring 38 is received. The annular flange 19 has an opening therethrough of a diameter slightly larger than the diameter of the driver shaft 34 so as to assist in journalling the driver shaft therein. The opening through the annular flange 19 may however be increased so as to facilitate the use of driver shafts 34 having enlarged diameters as well as a driver shafts 34 having reduced diameters.

Insofar as the driver shaft 34 has a removable bit 122, it is preferred that as shown, when the driver attachment 12 is in the fully extended position and the nose portion 24 is removed, the bit 122 be readily accessible for removal and replacement. In this regard, it is preferred that the nose portion 124 have a guideway 82 of a minimum diameter throughout its length at least equal to the diameter of the bit 122 such that the nose portion 24 may be removed from the rear portion 22 without the need to remove the bit 122 as may otherwise be the case in the event the guideway 82 may have a stepped configuration.

Operation of the driver attachment is now explained with particular reference to FIGS. 4 and 5. As seen in FIG. 4, the screws 16 to be driven are collated to be held parallel and spaced from each other by the plastic retaining strip 13.

In operation, a screwstrip 14 containing a number of screws 16 collated in the plastic retaining strip 13 is inserted into the channelway 88 with the first screw to be driven received within the guideway 82. To drive the first screw into the workpiece 124, the power driver 11 is activated to rotate the driver shaft 34. The driver shaft 34 and its bit 122, while they are rotated, are reciprocally movable in the guideway 82 towards and away from the workpiece 124. In a driving stoke, manual pressure of the user pushes the housing 18 towards the workpiece 124. With initial manual pressure, the forward end 25 of the nose portion engages the workpiece 124 to compress spring 38 so as to move slide body 20 relative the housing 18 into the housing 18 from an extended position shown in FIG. 4 to a retracted position. On release of this manual pressure, in a return stroke, the compressed spring 38 moves the slide body 20 back to the extended position thereby moving the housing 18 and the driver shaft 34 away from the workpiece.

In a driving stroke, as the driver shaft 34 is axially moved towards the workpiece, the bit 122 engages the screw head 17 to rotate the first screw to be driven. As is known, the plastic strip 13 is formed to release the screw 16 as the screw 16 advances forwardly rotated by the driver shaft 34. Preferably, on release of the screw 16, the plastic strip 13 deflects away from the screw 16 outwardly so as to not interfere with the screw 16 in its movement into the workplace. After the screw 16 is driven into the workpiece 124, the driver shaft 34 axially moves away from the workpiece under the force of the spring 38 and a successive screw 16 is moved via the screw feed advance mechanism from the channelway 88 through the access opening 86 into the guideway 82 and into axial alignment in the guideway with the driver shaft 34.

The screw 16 to be driven is held in position in axial alignment with the driver shaft 34 with its screw head 17 abutting the sidewall 83 in the guideway 82. As a screw 16 to be driven is moved into the cylindrical guideway 82, a leading portion of the strip 13' from which screws have previously been driven extends outwardly from the guideway 83 through the exit opening 87 permitting substantially unhindered advance of the screwstrip 14.

To assist in location of a screw to be driven within the guide tube 75, in the preferred embodiment the exit opening 87 is provided with a rearwardly facing locating surface 125 adapted to engage and support a forward surface 222 of the strip 13. Thus, on the bit 122 engaging the head of the screw and urging the screw forwardly, the screw may be axially located within the guide tube 75 by reason not only of the head of the screw engaging the sidewall 83 of the guideway but also with the forward surface 222 of the strip 13 engaging the locating surface 125 of the exit opening 87. In this regard, it is advantageous that the forward surface 222 of the retaining strip 13 be accurately formed having regard to the relative location of the screws 16 and particularly the location of their heads 17. The forward surface 222 of the strip 13 may be complementary formed to the locating surface 125 and if desired indexing notches or the like may be provided in the forward surface 222 of the strip 13 to engage with complementary notches or indents on the locating surface 125 of the entranceway to assist in indexing location of the strip 13 relative the locating surface and enhance the location thereby of the screw 16 within the guide tube 75.

Figure 8:
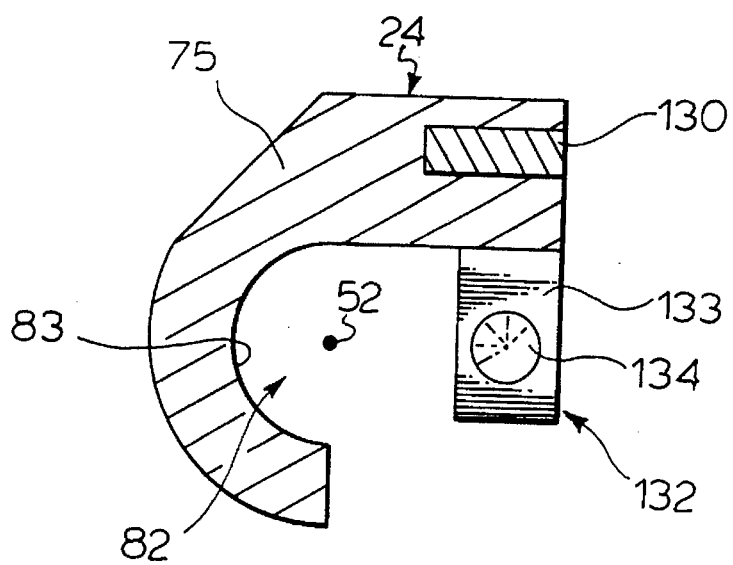
FIG. 8 is a cross-sectional view through section VIII—VIII' in FIG. 7.

Reference is now made to FIGS. 7 and 8 which show an alternate embodiment of a removable nose portion which provides another mechanism to locate each successively advanced screw axially aligned with the driver shaft 34. The alternate embodiment includes a retractable foot plate similar to that taught in U.S. Pat. No. 4,146,871 to Mueller et al. The foot plate 128 is provided to engage and fix the position of a screw adjacent the screw which is to be driven. As seen, the modified nose portion is provided with a slot 129 which extends rearwardly parallel longitudinal axis 52. The foot plate 128 has a general L-shape with a slide portion 130 axially slidably received within the slot 129 to slide therein in a direction parallel longitudinal axis 52. A spring 131 biases the foot plate 128 out of the slot 129 and while not shown, a suitable stop mechanism is provided to limit the foot plate 128 to extend from the slot 129 to a maximum distance.

The foot plate 128 has a foot portion 132 which extends normal to the longitudinal axis 52 and provides in a rearwardly facing surface 133 a conical recess 134. This recess 134 is located to be axially in line with the tip 15 of a "next" screw 16 in the screwstrip 14 adjacent the screw 16 to be driven.

In use of a driver attachment with a modified nose portion 24 as shown in FIGS. 7 and 8, the foot plate 128 is the first element of the attachment to engage the workpiece. On engaging the workpiece, the foot plate 128 slides rearwardly into the slot 129 and thus retracts into the nose portion 24. The foot portion 132 in moving rearwardly engages the tip 15 of the "next" screw 16 next to the screw 16 to be driven and accurately locates the tip 15 within the conical recess 134. The foot portion 132 applies a force to such next screw pushing the screw rearwardly so that the head 17 of the screw bears on the flat top wall 93 in the channelway 88. By reason of such next screw being firmly clamped between the foot plate 128 and the top wall 93 of the channelway, the screwstrip 14 is effectively locked into position and thereby assists in positioning the screw 16 which is to be driven axially aligned with the longitudinal axis 52. It is to be appreciated that different removable nose portions 24 may be provided with different foot plates 128 having appropriate relative location of the foot portion 132 and its conical recess having regard to the length of the screw and to the spacing between the screws along the retaining strip 13. In known manner, the foot plate 128 may be provided to be adjustable located on the nose portion 24.

FIGS. 7 and 8 show an embodiment of the nose portion 24 utilizing in combination three different mechanisms whereby a screw to be driven advanced through the screw guide channel mechanism is to be located axially in alignment with the driver shaft 34. The three mechanisms are the engagement of the screw head with the sidewall 83, the engagement of the spent strip 13' on the locating surface 125 of the exit opening 87, and the clamping of the next to be driven screw by the foot plate 128. Only one or more of these mechanisms need be provided particularly insofar as the channelway 88 may be precisely configured for specific sized screws 16 and screwstrips 14 and provide by itself generally increased support and location of the screwstrip 14 without restricting free sliding of the screwstrip and its screws therethrough. With an improved correspondence in sizing between the screwstrip 14 and the channelway 88 and the radial extent of the channelway effectively locating the screwstrip and its screws in a plane intersecting the longitudinal axis 52, a simple guide mechanism may be provided focussing principally on constraining the screwstrip 14 or its screw against movement radially relative the channelway 88.

The driver attachment 12 disclosed may be provided for different applications. In a preferred application, the driver may be used for high volume heavy load demands as, for example, as in building houses to apply sub-flooring and drywall. For such a configuration, it is preferred that with the power driver 11 comprising a typical screw gun which inherently incorporates a friction clutch and thus to the extent that a screw is fully driven into a workpiece, the clutch will, on the forces require to drive the screw becoming excessive, slip such that the bit will not be forced to rotate an engagement with the screw head and thus increase the life of the bit.

Figures 9, 10, 11:
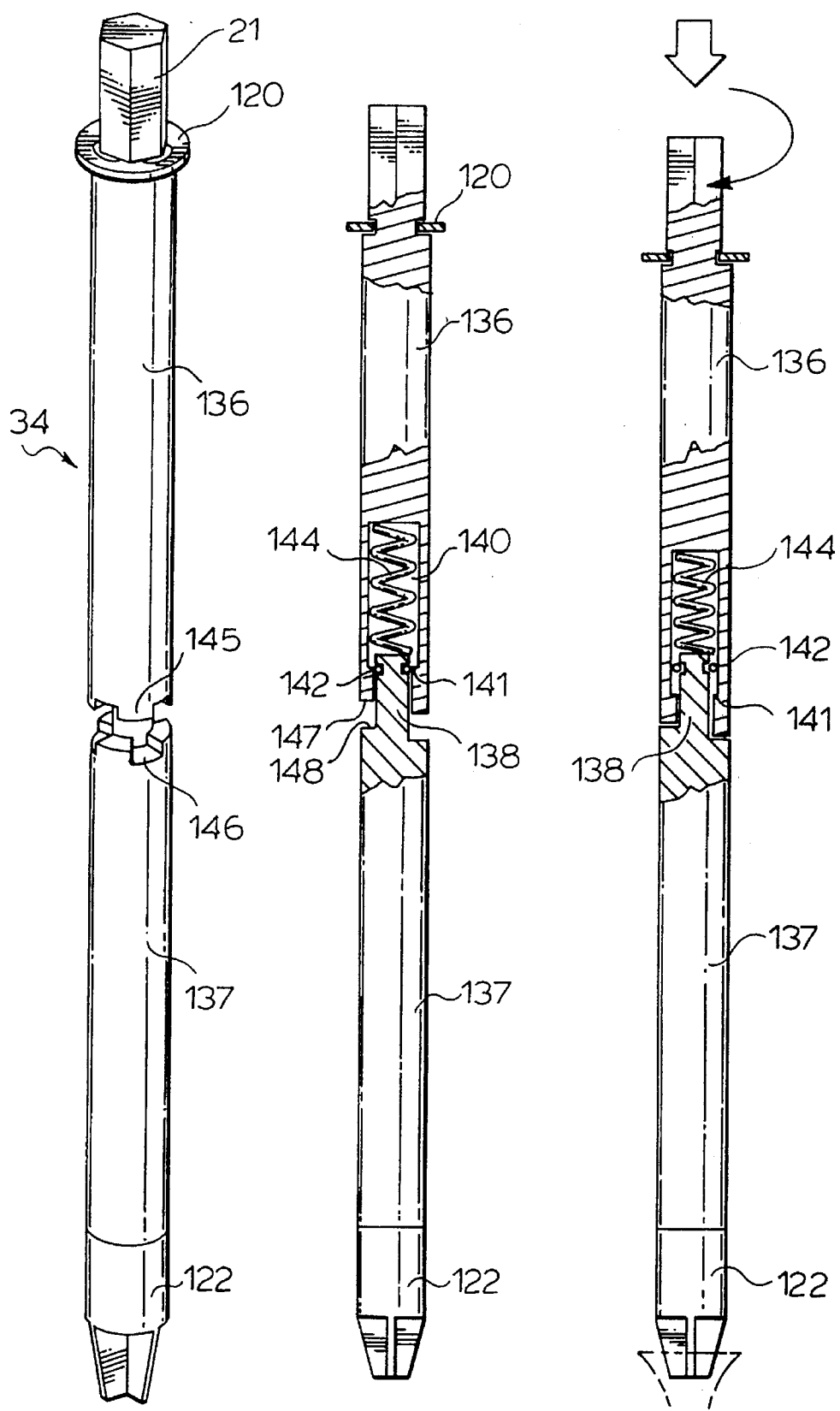
FIG. 9 is a pictorial view of an optional clutch drive shaft in accordance with another aspect of the invention.
FIG. 10 is a cross-sectional view of the drive shaft of FIG. 9 passing through the longitudinal axis in FIG. 9 and with the drive shaft in a disengaged position.
FIG. 11 is a view identical to that of FIG. 10 but with the drive shaft in an engaged position.

The driver attachment in accordance with the present invention is, however, adaptable for use with conventional power drills which are similar to screw guns yet do not incorporate a clutch mechanism. The driver attachment may be suitably used with a drill without a clutch preferably with the user manipulating the drill and driver attachment in use to reduce the likelihood of bit wear by the bit rotating relative the screw head in a jamming situation. FIGS. 9, 10 and 11 show an optional form of a driver shaft 34 which provides a simple clutch arrangement as for use with a power drill which does s not have a clutch.

Referring to FIGS. 9 to 11, the modified driver shaft 34 has a rear body 136 whose rear end is to be secured in the chuck 32 of a power drill in a normal manner. The driver shaft 34 has a front slide 137 which is axially slidable relative the rear body 136.

The front slide 137 includes a cylindrical rod 138 of reduced diameter which extends forwardly into a forwardly opening cylindrical bore 140 in the rear body. The bore 140 in the rear body has at its forward end a radially inwardly extending shoulder 141. A split ring 142 carried on the rod 138 is received in an annular groove 143 about the rod 138. The split ring 142 is provided such that the split ring may be compressed into the groove 143 to permit the rod 138 to be inserted into the bore 140. Once inside the bore 140, the split ring 142 expands outwardly and will engages with the shoulder 141 so as to retain the rod 138 in the bore 140 against removal. A spring 144 is provided within the bore 140 and biases the front slide 137 forwardly away from the rear body 136.

The rear body 136 and front slide 137 have opposed clutch surfaces 147 and 148 which when urged together cause the rear body and front slide to rotate in unison. However, when the clutch surfaces are disengaged, the rear body 136 may rotate without rotation of the front slide 137. As shown in the drawings, the clutch surfaces comprise complementary teeth and slots on the opposed axially directed end surfaces of the rear body 136 and the front slide 137. For example, a tooth 145 on rear body 136 is adapted to be received within a slot 146 on front slide 137. While axially directed clutch surfaces with teeth may be provided, there are a wide variety of known clutch surfaces which may provide tooth and/or frictional surfaces engagement to transfer rotational forces from the rear body 136 to the front slide 137 when the clutch surfaces are urged axially into each other. Other preferred surfaces include conical surfaces.

In use of a driver attachment with the clutch driver shaft 34 shown in FIGS. 9 to 11, when a screw with initially engaged by the bit of the driver shaft and a person using the screwdriver assembly pushes down on the screw, the downward pressure applied by the user compresses the spring 144 and the rear surfaces 148 of the front slide 137 engage the front surfaces 149 of the rear body 136 in the manner that they are coupled together for rotation. The coupled position is shown in cross section in FIG. 11. In this collapsed and engaged position, a screw 16 may be driven. On the screw being driven down into a workpiece, the depth stop mechanism including for example the rod 110 may be utilized to stop the rear body 136 from moving further towards the workpiece. The rear body 136 stops from further movement towards the workpiece at a position that the screw is almost fully driven into the workpiece. At this point, with further rotation of the driver shaft 34, as the screw is driven by the rotation of the driver shaft 34 further downward into the workpiece, the screw is drawn away from the rear body 136. Spring 144 to some extent assists in ensuring that the bit remains engaged in the head of the screw. Once the screw head is further advanced into the workpiece an axial distance greater than the axial height of the teeth 145 then the teeth 145 will become disengaged from the slots 146 and the rear body 136 will rotate driven by the power drill freely relative to the front slide 137. It is to be appreciated that by suitably selecting the depth at which the housing 18 and therefore the rear body 136 is stopped relative the workpiece, the front slide 137 can be permitted to disengage from rotation with the rear body 136 at a position that the screw becomes screwed into the workplace a desired extent.

The preferred embodiment illustrated in FIG. 1 shows a screwdriver assembly as including a known cartridge 9 which has a hinge door 150 permitting the insertion of a coil of the screwstrip 14 containing, for example, up to 1000 screws. It is to be appreciated that the use of such a cartridge is not necessary. For example, rather than provide such a cartridge, lengths of the screwstrip could be provided for example, one or two feet long which could merely be manually fed into the channelway 88 when desired.

The driver attachment may be constructed from different materials of construction having regard to characteristics of wear and the intended use of the attachment. Preferably, a number of the parts may be molded from nylon or other suitably strong light weight materials. Parts which are subjected to excessive wear as by engagement with the head of the screw may be formed from metal or alternatively metal inserts may be provided within an injection molded plastic or nylon parts. The provision of a removable nose portions 24 also has the advantage of permitting removable nose portions to be provided with surfaces which would bear the greatest loading and wear and which nose portions may be easily replaced when worn.

The screw feed advance mechanism carried on the nose portion has been illustrated merely as comprising a reciprocally slidable shuttle carrying a pawl. Various other screw feed advance mechanisms may be provided such as those which may use rotary motion to incrementally advance the screws. Similarly, the screw feed activation mechanism comprising the lever 48 and the cam follower have been shown as one preferred mechanism for activating the screw feed advance mechanism yet provide for simple uncoupling as between the shuttle 96 and the lever 48. Other screw feed activation means may be provided having different configurations of cam followers with or without levers or the like.

In the preferred embodiment, the screwstrip 14 is illustrated as having screws extending normal to the longitudinal extension of the strip 13 and in this context, the channelway 88 is disposed normal to the longitudinal axis 52. It is to be appreciated that screws and other fasteners may be collated on a screwstrip in parallel spaced relation however at an angle to the longitudinal axis of the retaining strip in which case the channelway 88 would be suitably angled relative the longitudinal axis so as to locate and dispose each successive screw parallel to the longitudinal axis 52 of the driver shaft.

A preferred collated screwstrip 14 for use in accordance with the present invention is as illustrated in the drawings and particularly FIG. 3 and are substantially in accordance with Canadian Patent 1,054,982. The screwstrip 14 comprises a retaining strip 13 and a plurality of screws 16. The retaining strip 13 comprises an elongate thin band formed of a plurality of identical sleeves interconnected by lands 106. A screw 16 is received within each sleeve. Each screws 16 has a head 17, a shank 208 carrying external threads 214 and a tip 15. As shown, the external threads extend from below the head 17 to the tip 15.

Each screw is substantially symmetrical about a central longitudinal axis 212. The head 17 has in its top surface a recess 213 for engagement by the screwdriver bit.

Each screw is received with its threaded shank 208 engaged within a sleeve. In forming the sleeves about the screw, as in the manner for example described in Canadian Patent 1,040,600, the exterior surfaces of the sleeves come to be formed with complementary threaded portions which engage the external thread 214 of the screw 16. Each sleeve has a reduced portion between the lands 206 on one first side of the strip 13. This reduced strength portion is shown where the strip extends about each screw merely as a thin strap-like portion or strap 220.

The strip 13 holds the screw 16 in parallel spaced relation a uniform distance apart. The strip 13 has a forward surface 222 and a rear surface 223. The lands 106 extend both between adjacent screws 16, that is, horizontally as seen in FIG. 3, and axially of the screws 16, that is, in the direction of the longitudinal axes 212 of the screws. Thus, the lands comprise webs of plastic material provided over an area extending between sleeves holding the screws and between the forward surface 222 and the rear surface 223. A land 206 effectively is disposed about a plane which is parallel to a plane in which the axes 212 of all the screws lies. Thus, the lands 206 comprise a web which is disposed substantially vertically compared to the vertically oriented screws as shown in the figures. The lands 206 and the sleeves, in effect, are disposed as a continuous, vertically disposed strip 13 along the rear of the screws 16, that is, as a strip 13 which is substantially disposed about a plane which is parallel to a plane containing the axes of all screws.

A preferred feature of the screwstrip 14 is that it may bend to assume a coil-like configuration due to flexibility of the lands 206, such that, for example, the screwstrip could be disposed with the heads of the screws disposed into a helical coil, that is, the plane in which all the axes 212 of the screws lie may assume a coiled, helical configuration to closely pack the screws for use. Having the lands 206 and sleeves as a vertically extending web lying in the plane parallel that in which the axes 212 permits such coiling.

The invention is not limited to use of the collated screwstrips illustrated. Many other forms of screwstrips may be used such as those illustrated in U.S. Pat. Nos. 3,910,324 to Nasiatka; 5,083,483 to Takagi; 4,019,631 to Lejdegard et al and 4,018,254 to Delcaro.

While the invention has been described with reference to preferred embodiment, the invention is not so limited. Many variations and modifications will now occur to persons skilled in the art. For a definition of the invention, reference is made to the appended claims.

We claim:

1. An apparatus for driving with a power driver a screwstrip comprising threaded fasteners such as screws or the like, which are joined together in a strip comprising:

housing means;

elongate drive shaft means for operative connection to a power driver for rotation thereby and defining a longitudinal axis;

slide body means coupled to the housing means for displacement parallel to the axis of the drive shaft means between an extended position and a retracted position;

spring means biasing said body means forwardly relative to the housing means parallel the axis to the extended position;

the slide body means having a rear portion and a forward nose portion, the nose portion removably coupled to the rear portion;

the nose portion having:

(a) guide channel means for said screwstrip extending through said nose portion, (b) guide means to locate successive of the screws advanced via the guide channel means to be axially in alignment with said drive shaft means for engagement in driving of the screws from the guide means by the drive shaft means, and (c) screw feed advance means carried by the nose portion to engage the screwstrip and successively, incrementally advance screws on the screwstrip through the guide channel means, screw feed activation means coupled between the rear portion of the slide body means and the housing means and, when the nose portion is coupled to the rear portion, rearwardly coupling with the screw feed advance means whereby displacement of the slide body means relative the housing means between the extended position and the retracted position activates the screw feed activation means to move the screw feed advance means and thereby advance successive screws;

wherein the nose portion removably couples to and is removable from the rear portion for replacement with other nose portions adapted to receive the same or different sized screwstrips and/or screws; and wherein on the nose portion coupling to or being removed from coupling with the rear portion, the screw feed advance means correspondingly removably coupling to or being removed from coupling with the screw feed activation means.

2. An apparatus as described in claim 1 wherein the nose portion couples to and is removable from the rear portion by relative movement parallel the longitudinal axis.

3. An apparatus as claimed in claim 2 wherein the nose portion couples to and is removable from the rear portion by manual manipulation without tools.

4. An apparatus as claimed in claim 2 wherein the nose portion couples to the rear portion in a friction fit relation permitting removal by the manual application of forces.

5. An apparatus as claimed in claim 3 wherein the nose portion is keyed to the rear portion against relative rotation about the longitudinal axis.

6. An apparatus as claimed in claim 1 wherein the screw feed activation means comprises:

cam surfaces on the housing means, and cam follower means carried by the rear portion of the slide body means.

7. An apparatus as claimed in claim 6 wherein the screw feed activation means comprises:

lever means pivotally mounted to the rear portion of the slide body means for pivoting about a pivot axis, the lever means having a forward arm extending forwardly to releasably couple with the screw feed advance means, the lever means coupled to the cam follower means whereby relative displacement of the housing means and the slide body means translates into relative pivoting of the forward arm about the pivot axis.

8. An apparatus as claimed in claim 7 wherein the screw feed advance means comprises a shuttle secured to the nose portion for reciprocal movement towards and away from the longitudinal axis.

9. An apparatus as claimed in claim 8 wherein:

the forward arm of the lever means has a front end, the shuttle has a rearwardly directed opening, the lever means releasably coupling to the shuttle by the front end of the forward arm of the lever means being received in the opening of the shuttle.

10. An apparatus as claimed in claim 9 wherein the shuttle is slidable relative the nose portion in a direction parallel the guide channel means, and generally normal to both the longitudinal axis and the pivot axis.

11. An apparatus as claimed in claim 10 wherein the shuttle carries pawl means to engage and advance the screwstrip in sliding of the shuttle towards the longitudinal axis.

12. An apparatus as claimed in claim 1 wherein:

the guide channel means comprises a straight channel with a cross-section closely corresponding at least in part to that of the screwstrip received therein to constrain the strip and screws received therein against substantial movement other than parallel the channel, the channel extending generally transverse to the longitudinal axis.

13. An apparatus as claimed in claim 12 wherein the guide means comprises guide tube means coaxially about the axis of the drive shaft means adapted to receive correspondingly sized screws, the guide tube means comprising a cylindrical screw guideway of an inner diameter marginally greater than a diameter of a head of the correspondingly sized screws, the guide tube means having a screw locating sidewall about the screw guideway to engage the head of a screw and coaxially locate the screw in alignment with the drive shaft means.

14. An apparatus as claimed in claim 13 wherein the guide channel means opens radially into the screw guideway via a screw access opening in the screw locating sidewall and exits radially from the guideway via a strip exit opening in the screw locating sidewall on a side of the guideway opposite the screw access opening.

15. An apparatus as claimed in claim 14 wherein the guide tube means includes rearward of the screw guideway a cylindrical shaft guideway of an inner diameter marginally greater than a diameter of the drive shaft means, the guide tube means having a journal ling sidewall about the shaft guideway to engage the drive shaft means and coaxially locate the drive shaft means within the guide tube means.

16. An apparatus as claimed in claim 15 wherein the diameter of the screw guideway is greater than the diameter of the shaft guideway.

17. An apparatus as claimed in claim 2 wherein said rear portion of the slide body means has a forwardly opening bore about said drive shaft means, the bore having a forward open end;

said nose portion including a hollow tubular extension removable and insertable axially into the bore via the forward end of the bore.

18. An apparatus as claimed in claim 15 wherein the drive shaft means comprises an elongate mandrel with bit means removably secured to the forward end thereof and wherein the shaft guideway engages the mandrel.

19. An apparatus as claimed in claim 1 wherein the nose portion is removable and insertable without uncoupling of the nose portion of the body means relative the housing means, spring means, power drive means and screw feed activation means.

20. An apparatus as claimed in claim 1 wherein the nose portion is removable from and couples to the rear portion without uncoupling of any remaining elements of the apparatus.

21. An apparatus as claimed in claim 7 wherein the lever means having a rear arm extending rearwardly to a rear end with the cam follower means carried on the rear end of the rear arm.

22. An apparatus as claimed in claim 1 wherein:

the spring means is disposed between the housing means and the rear portion of the body means, coaxially about the longitudinal axis, the apparatus including stop means retaining the rear portion coupled to the housing means against movement under the bias of the spring means from the retracted position to the extended position.

23. An apparatus as claimed in claim 8 wherein the shuttle is reciprocally movable between an advanced and a retracted position, pawl means carried by the shuttle to engage the screwstrip to advance the screwstrip within the guide channel means on movement of the shuttle from the retracted position to the advanced position.

24. An apparatus for driving with a power driver threaded fasteners such as screws or the like, which are joined together in a screwstrip comprising:

housing means, elongate drive shaft means for operative connection to a power driver for rotation thereby and defining a longitudinal axis, slide body means coupled to the housing means for displacement parallel to the axis of the drive shaft means between an extended position and a retracted position, spring means biasing said body means forwardly relative to the housing means parallel the axis to the extended position, the slide body means having a rear portion and a nose portion removably coupled to the rear portion, the nose portion having:

(a) a guide channel for said screwstrip extending through said nose portion generally transversely to the longitudinal axis to constrain the screwstrip received therein against substantial movement other than parallel the channel, (b) guide means coaxially about the axis of the drive shaft means adapted to receive correspondingly sized screws when advanced therein via the guide channel means and to locate the screws axially in alignment with said drive shaft means for engagement in driving of the screws from the guide tube means by the drive shaft means, and (c) screw feed advance means for reciprocal movement relative the nose portion to engage the screwstrip and successively, incrementally advance screws in the screwstrip through the guide channel into the guide means, screw feed activation means secured to the rear portion and removably coupled to the advance means when the nose portion is coupled to the rear portion, the screw feed activation means coupled between the rear portion of the slide body means and the housing means whereby displacement of the slide body means relative the housing means between the extended position and the retracted position results in the screw feed activation means reciprocally moving the screw feed advance means to advance successive screws, the nose portion removably couples to and is removable from the rear portion and the screw feed activation means for replacement with other nose portions adapted to receive the same or different screwstrips and/or screws without uncoupling of any remaining elements of the apparatus.

* * * * *